US012535563B2

(12) United States Patent
Borden

(10) Patent No.: US 12,535,563 B2
(45) Date of Patent: Jan. 27, 2026

(54) COAXIAL LIDAR SYSTEM USING A DIFFRACTIVE WAVEGUIDE

(71) Applicant: Ouster, Inc., San Francisco, CA (US)

(72) Inventor: Michael Bryan Borden, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 839 days.

(21) Appl. No.: 17/819,526

(22) Filed: Aug. 12, 2022

(65) Prior Publication Data

US 2023/0047931 A1 Feb. 16, 2023

Related U.S. Application Data

(60) Provisional application No. 63/260,205, filed on Aug. 12, 2021.

(51) Int. Cl.
| | | |
|---|---|---|
| G01S 7/48 | (2006.01) | |
| G01S 7/481 | (2006.01) | |
| G01S 7/4861 | (2020.01) | |
| G01S 17/931 | (2020.01) | |
| G02B 27/30 | (2006.01) | |
| G02B 6/10 | (2006.01) | |

(52) U.S. Cl.
CPC .......... *G01S 7/4812* (2013.01); *G01S 7/4814* (2013.01); *G01S 7/4816* (2013.01); *G01S 7/4861* (2013.01); *G01S 17/931* (2020.01); *G02B 27/30* (2013.01); *G02B 6/10* (2013.01)

(58) Field of Classification Search
None
See application file for complete search history.

(56) References Cited

U.S. PATENT DOCUMENTS

| | | |
|---|---|---|
| 5,659,420 A | 8/1997 | Wakai et al. |
| 9,028,157 B2 | 5/2015 | Na et al. |
| 9,075,184 B2 | 7/2015 | Popovich et al. |
| 9,575,341 B2 | 2/2017 | Heck et al. |
| 9,621,876 B2 | 4/2017 | Federspiel |
| 9,632,226 B2 | 4/2017 | Waldern et al. |
| 10,345,576 B2 | 7/2019 | Blanche et al. |
| 10,473,767 B2 | 11/2019 | Xiang et al. |
| 10,732,266 B2 | 8/2020 | Popovich et al. |
| 2002/0003617 A1 | 1/2002 | Doemens et al. |
| 2007/0057211 A1 | 3/2007 | Bahlman et al. |
| 2014/0160562 A1 | 6/2014 | Minami |
| 2017/0299794 A1 | 10/2017 | Fattal |
| 2019/0041634 A1 | 2/2019 | Popovich et al. |

(Continued)

FOREIGN PATENT DOCUMENTS

| | | |
|---|---|---|
| EP | 3248026 B1 | 9/2019 |
| EP | 3407128 B1 | 3/2021 |

(Continued)

OTHER PUBLICATIONS

Application No. EP22856661.8, Extended European Search Report, Mailed on May 16, 2025, 10 pages.

(Continued)

*Primary Examiner* — Hovhannes Baghdasaryan
(74) *Attorney, Agent, or Firm* — Kilpatrick Townsend & Stockton LLP

(57) ABSTRACT

A coaxial lidar system includes one or more emitter channels and one or more sensor channels that share an optical module. A diffractive waveguide can be used to redirect received light from the shared optical module to the sensor channels.

20 Claims, 10 Drawing Sheets

(56) References Cited

U.S. PATENT DOCUMENTS

2019/0146088 A1    5/2019   Pacala et al.
2019/0204419 A1    7/2019   Baba et al.
2019/0369258 A1   12/2019   Hall et al.

FOREIGN PATENT DOCUMENTS

| WO | 2017134412 A1 | 8/2017 |
| WO | 2018161203 A1 | 9/2018 |
| WO | 2018213200 A1 | 11/2018 |
| WO | 2019079350 A2 | 4/2019 |
| WO | 2020002164 A1 | 1/2020 |

OTHER PUBLICATIONS

Application No. PCT/US2022/040177, International Search Report and Written Opinion, Mailed on Nov. 15, 2022, 7 pages.
Villa et al., "SPADs and SiPMs Arrays for Long-Range High-Speed Light Detection and Ranging (LiDAR)", Sensors 2021, 21, 3839. https://doi.org/10.3390/ s21113839; Jun. 1, 2021, 23 pages.

COAXIAL LIDAR SYSTEM USING A DIFFRACTIVE WAVEGUIDE

CROSS-REFERENCE TO RELATED APPLICATIONS

This application claims the benefit of U.S. Provisional Patent Application No. 63/260,205 filed Aug. 12, 2021, which is incorporated herein by reference.

BACKGROUND

This disclosure relates generally to lidar systems, and in particular to lidar systems incorporating diffractive waveguides.

Light imaging, detection and ranging (lidar) systems measure distance to a target by illuminating the target with a pulsed laser light and measuring the reflected pulses with a sensor. Time-of-flight measurements can then be used to make a digital 3D representation of the target. Lidar systems can be used for a variety of applications where 3D depth images are useful including archaeology, geography, geology, forestry, mapping, construction, medical imaging, and military applications, among others. In some applications, for instance, autonomous vehicles can use lidar for obstacle detection and avoidance as well as vehicle navigation.

Compact and lightweight lidar systems are desirable, particularly for mobile applications such as vehicle systems.

SUMMARY

Certain embodiments of the present invention relate to lidar systems that can emit and receive light through the same optical path, in which a diffractive waveguide is used to redirect the received light into a sensor array.

According to some embodiments, a lidar system can include an emitter channel, a sensor channel, micro-optic elements, and a diffractive waveguide. The emitter channel can include a light source to produce light at an operating wavelength and a first micro-optic element to collimate the light produced by the light source. The sensor channel can include a photosensor and can be disposed at a lateral distance from the emitter channel. A second micro-optic element can be provided to diverge the collimated light from the first micro-optic element and to collimate light received from an environment. The diffractive waveguide, which can be disposed between the first micro-optic element and the second micro-optic element, can include a diffraction grating that redirects received light having the operating wavelength from the second micro-optic element toward the sensor channel. In some embodiments, a bulk optic module can be disposed between the second micro-optic element and the environment such that the emitter channel and the sensor channel have a common optical axis in the bulk optic module.

In some embodiments, a first diffraction grating can disposed at a first surface of the diffractive waveguide. The first diffraction grating can be configured to redirect received light having the operating wavelength from the second micro-optic element into the diffractive waveguide at an angle that produces total internal reflection at a second surface of the diffractive waveguide, which can be opposite the first surface. A second redirection component (which can be, e.g., a second diffraction grating or a mirror) can be positioned to redirect received light that has reflected off the second surface in a direction out of the diffractive waveguide and into the sensor channel. In some embodiments the first diffraction grating can include a non-diffractive opening sized and positioned such that the collimated light from the emitter channel passes through the non-diffractive opening. In some embodiments, the first surface can be oriented toward the second micro-optic element, and the first diffraction grating can be a transmissive grating. In other embodiments, the first surface can be oriented toward the first micro-optic element, and the first diffraction grating can be a reflective grating.

According to some embodiments, a lidar system can include an array of emitter channels, an array of sensor channels, micro-optic elements, and a diffractive waveguide. Each emitter channel in the array of emitter channels can include a light source to produce light at an operating wavelength and a first micro-optic element to collimate the light produced by the light source. The array of sensor channels can be arranged such that each sensor channel corresponds to a different one of the emitter channels, and each sensor channel can include a light detector. An array of second micro-optic elements can be provided, with each second micro-optic element being configured to diverge the collimated light from a corresponding one of the emitter channels and to collimate light received from an environment. The diffractive waveguide can be disposed between the first micro-optic elements and the array of second micro-optic elements and can include a diffraction grating that redirects received light having the operating wavelength from the array of second micro-optic elements toward the array of sensor channels. In some embodiments, a bulk optic module can be disposed between the array of second micro-optic elements and the environment such that the emitter channels and the sensor channels have a common optical axis in the bulk optic module. In some embodiments, the array of emitter channels and the array of sensor channels are formed on the same substrate, and the arrays can be, e.g., one-dimensional or two-dimensional arrays.

In some embodiments, a first diffraction grating can disposed at a first surface of the diffractive waveguide. The first diffraction grating can be configured to redirect received light having the operating wavelength from the array of second micro-optic elements into the diffractive waveguide at an angle that produces total internal reflection at the second surface. A second redirection component (which can be, e.g., a second diffraction grating or a mirror) can be positioned to redirect received light that has reflected off the second surface in a direction out of the diffractive waveguide and into the sensor channels. In some embodiments the first diffraction grating can include an array of non-diffractive openings sized and positioned such that the collimated light from each of the emitter channel passes through one of the non-diffractive openings. In some embodiments, the first surface can be oriented toward the second micro-optic element, and the first diffraction grating can be a transmissive grating. In other embodiments, the first surface can be oriented toward the first micro-optic element, and the first diffraction grating can be a reflective grating.

The following detailed description, together with the accompanying drawings, will provide a better understanding of the nature and advantages of the claimed invention.

DETAILED DESCRIPTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

1. Lidar System Overview

Figure 1B:
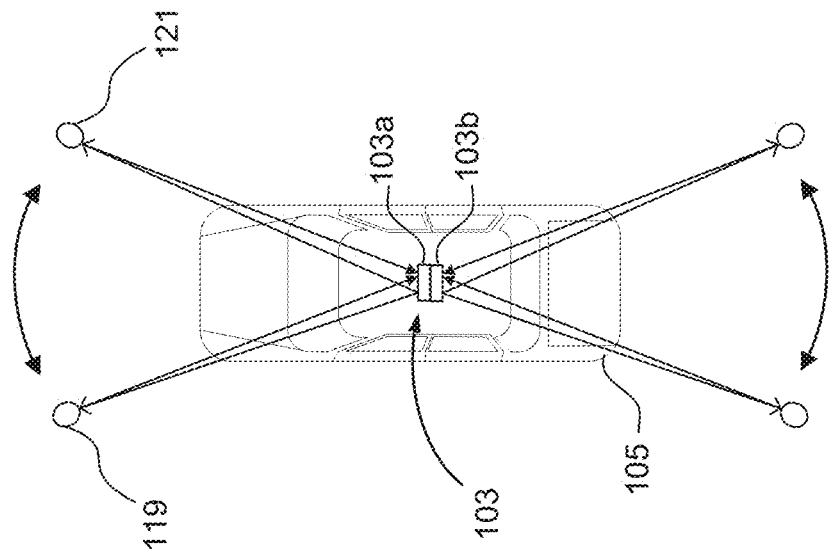
FIGS. 1A-1B show an automotive application for light ranging devices, also referred to herein as lidar systems, according to some embodiments.
Figure 1A:
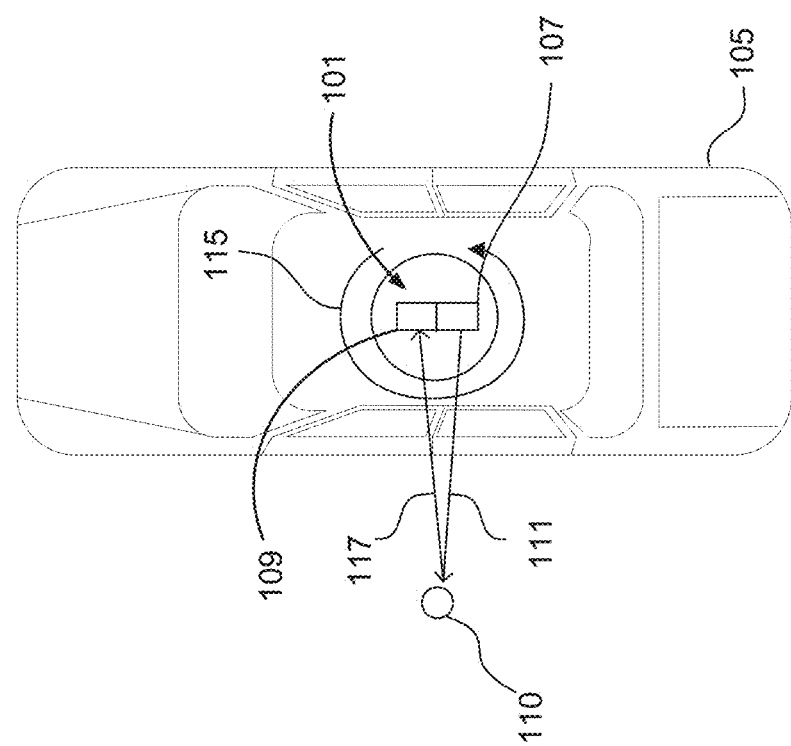

FIGS. 1A-1B show an automotive application for light ranging devices, also referred to herein as lidar systems, according to some embodiments. The automotive application for the lidar systems is chosen here merely for the sake of illustration, and the systems described herein may be employed in other types of vehicles, e.g., boats, aircraft, trains, forklifts, tractors, etc. Lidar systems of the kind described herein may also be employed in a variety of other applications where 3D depth images are useful, such as medical imaging, mobile phones, augmented reality, security systems, smart infrastructure, photography, geodesy, geomatics, archaeology, geography, geology, geomorphology, seismology, forestry, atmospheric physics, laser guidance, airborne laser swath mapping (ALSM), laser altimetry, and so on. According to some embodiments, lidar systems of the kind described herein can be mounted on or otherwise incorporated into moving objects or stationary objects, depending on the particular application. For instance, as shown in FIGS. 1A and 1B, a lidar system, e.g., rotating lidar system 101 and/or static lidar system 103, can be mounted on the roof of a vehicle 105.

The rotating (or scanning) lidar system 101 shown in FIG. 1A can employ a scanning architecture, where the orientation of the lidar light source 107 and/or detector circuitry 109 can be scanned around one or more fields of view 110 within an external field or scene (also referred to as an "environment") that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the lidar system 101, can be scanned, e.g., rotated, to illuminate a scene around the vehicle. In some embodiments, the scanning, represented by rotation arrow 115, can be implemented by mechanical means, e.g., by mounting the light emitters and/or sensors to a rotating column or platform. In some embodiments, the scanning can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, or the like. In some embodiments, scanning can be effectuated through non-mechanical means, e.g., by using electronic signals to steer one or more optical phased arrays.

For a stationary architecture, like static lidar system 103 shown in FIG. 1B, one or more solid state lidar subsystems (e.g., 103a and 103b) can be mounted to the vehicle 105. Each solid state lidar subsystem can face a different direction (possibly with partially overlapping and/or non-overlapping fields of view between units) so as to capture a composite field of view that is larger than each unit is capable of capturing on its own.

In either the scanning or stationary architectures, objects within the scene can reflect portions of the light pulses that are emitted from the lidar light sources. One or more reflected portions then travel back to the lidar system and can be detected by the detector circuitry. For example, reflected portion 117 can be detected by detector circuitry 109. The detector circuitry can be disposed in the same housing as the emitters. Aspects of the scanning system and stationary system are not mutually exclusive and thus can be used in combination. For example, the individual lidar subsystems 103a and 103b in FIG. 1B can employ steerable emitters such as an optical phased array or the composite unit may rotate through mechanical means thereby scanning the entire scene in front of the lidar system, e.g., from field of view 119 to field of view 121.

As shown in FIG. 1A, in lidar systems such as lidar system 101, a pulsed output beam from a light source 107 can reflect off an object in the environment (or scene) and into a detector 109 of the lidar system. Based on the travel time of the light pulse, distance to the reflective object can be determined. Performance of a lidar system depends on a number of factors, including the efficiency with which output light can be directed to a particular location in the scene and the efficiency with which reflected light can be gathered and delivered to the detectors. Accordingly, lidar systems can include optical elements to shape and direct emitted and/or received light. In embodiments described herein, the light paths for emitted and received light can share optical elements, and lidar systems having this property are referred to herein as "coaxial."

2. Coaxial Lidar System

Figure 2:
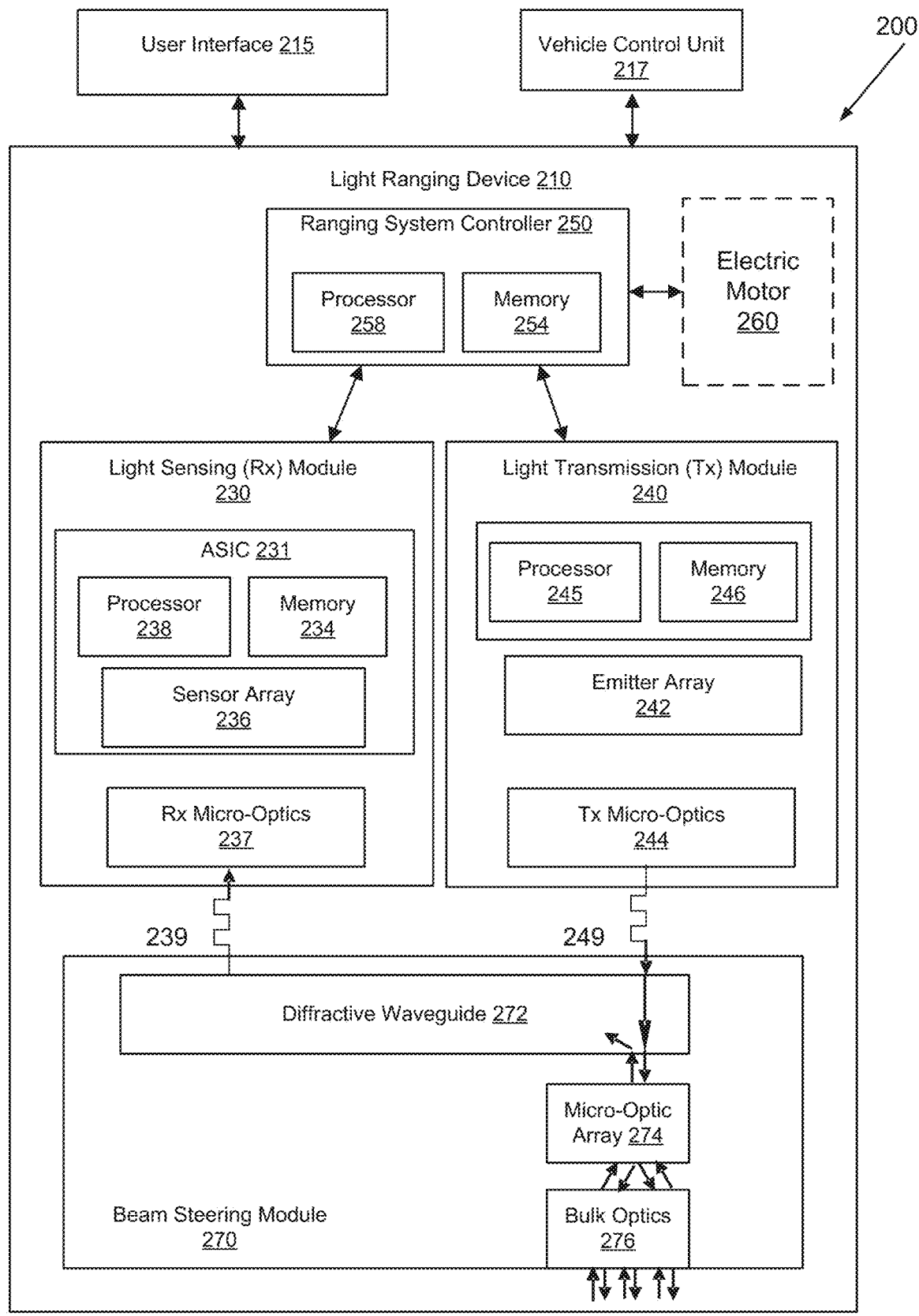
FIG. 2 shows a more detailed block diagram of a lidar system according to some embodiments.

FIG. 2 shows a more detailed block diagram of a lidar system 200 according to some embodiments. Lidar system 200 includes light ranging device 210. Light ranging device 210 includes a ranging system controller 250, a light transmission (Tx) module 240 and a light sensing (Rx) module 230. Ranging data can be generated by light ranging device 210 by transmitting one or more light pulses 249 from light transmission module 240 to objects in a field of view surrounding light ranging device 210. Reflected portions 239 of the transmitted light are then detected by light sensing module 230 after some delay time. Based on the delay time, the distance to the reflecting surface can be determined. Other ranging methods can be employed as well, e.g. continuous wave, Doppler, and the like.

Tx module 240 (which can implement lidar light source 107 of FIG. 1A) can include an emitter array 242, which can be a one-dimensional or two-dimensional array of emitters, and Tx micro-optics 244, which when taken together can form an array of micro-optic emitter channels. Emitter array 242 or the individual emitters are examples of laser sources. Emitter array 242 and Tx micro-optics 244 taken together can form an array of micro-optic emitter channels. Using additional optical elements (such as beam steering module 270 described below), light emitted from each micro-optic emitter channel can be directed to illuminate a different pixel in a field of view of a surrounding environment. Tx module 240 can also include a processor 245 and a memory 246. In some embodiments, a pulse coding technique can be used, e.g., Barker codes and the like. In such cases, memory 246 can store pulse-codes that indicate when light should be transmitted. For instance, pulse-codes can be stored as a sequence of integers stored in memory 246.

Rx module 230 can include a sensor array 236, which can be, e.g., a one-dimensional or two-dimensional array of photosensors. Each photosensor (also just called a sensor) can include a collection of photodetectors, e.g., single-photon avalanche diodes (SPADs) or the like, or a sensor can be a single photon detector (e.g., an avalanche photodiode (APD)). Like Tx module 240, Rx module 230 includes Rx micro-optics 237. Rx micro-optics 237 and sensor array 236 taken together can form an array of micro-optic receiver channels. Each micro-optic receiver channel measures light that corresponds to one of the pixels in the field of view, and sensor array 236 can provide an image (e.g., a depth image) of the field of view. Each sensor of sensor array 236 can correspond to a particular emitter of emitter array 242. For example, the geometric arrangement of receiver channels in Rx module 230 can correspond to the geometric arrangement of emitter channels in Tx module 240, such that reflected light originating from a particular emitter channel is received at the corresponding receiver channel.

According to some embodiments, a beam steering module 270 can be positioned in the path of output light 249 and reflected light 239 such that transmitted light pulses 249 exit light ranging device 210 via beam steering module 270 and reflected light 239 enters light ranging device 210 via the same beam steering module 270. As shown in FIG. 2, beam steering module 270 can include a diffractive waveguide 272, a secondary micro-optic array 274, and a bulk optic module 276. Diffractive waveguide 272 can allow transmitted light pulses 249 from Tx module 240 to pass through undiffracted into secondary micro-optic array 274 and bulk optic module 276. Reflected light can enter light ranging device 210 via the same bulk optic module 276 and micro-optic array 274. For example, the reflected light can follow (in the reverse direction) approximately the same optical path as the transmitted light. Diffractive waveguide 272 can steer (or guide) reflected light 239 from micro-optic array 274 to Rx module 230. Example implementations of beam steering module 270 are described below. A lidar system where the transmit and receive paths share at least a bulk optical module, such as lidar system 200, is referred to herein as a "coaxial" lidar system.

In some embodiments, emitter array 242 of Tx module 240 and sensor array 236 of Rx module 230 are each fabricated as part of a monolithic device on a single substrate (using, e.g., CMOS technology). In some embodiments, emitter array 242 and sensor array 236 are fabricated as part of a monolithic device on the same substrate, which can facilitate channel alignment. A monolithic device incorporating sensor array 236 (and optionally emitter array 242) can also include an ASIC 231 implementing a memory 234 (e.g., SRAM) and processor 238 for storage and signal-processing of the raw histograms from individual sensor channels in sensor array 236. As an example of signal processing, for each photon detector or grouping of photon detectors, memory 234 of ASIC 231 can accumulate counts of detected photons over successive time bins, and these time bins taken together can be used to recreate a histogram, or time series, of the reflected light pulse (i.e., a count of photons vs. time). ASIC 231 can implement matched filters and peak detection processing to identify time bins corresponding to return signals. In addition, processor 238 of ASIC 231 can implement various signal processing techniques, such as multi-profile matched filtering to help recover a photon time series that is less susceptible to pulse shape distortion that can occur due to photodetector saturation, quenching, or other effects. In some embodiments, all or parts of such signal processing can be performed by processor 258, which may be implemented as an FPGA.

In some embodiments, Rx micro-optics 237 can also be part of the same monolithic structure as sensor array 236, and Tx micro-optics 244 can be part of the same monolithic structure as emitter array 242. (As noted above, emitter and sensor arrays can be part of the same monolithic structure, fabricated on the same substrate.) Separate substrate layers can be provided for each channel layer or optical elements. For example, to form an array of receiver channels, an aperture layer, a collimating or focusing lens layer, an optical filter layer, and a photodetector layer (e.g., SPADs) can be stacked and bonded at the wafer level before dicing. Similarly, to form an array of emitter channels, an aperture layer, a collimating or focusing lens layer, and an emitter layer (e.g., VCSELs) can be stacked and bonded at the wafer level before dicing. An aperture layer can be formed by laying a non-transparent substrate having a pattern of openings, holes, or other transparent portions) on top of a transparent substrate or by coating a transparent substrate with an opaque film and removing portions of the film to create the apertures. In other embodiments, one or more components of Rx module 230 or Tx module 240 may be external to the monolithic structure. For example, an aperture layer may be implemented as a separate metal sheet with pin-holes. Other fabrication techniques can also be used.

In some embodiments, the photon time series (or histograms) output from ASIC 231 are sent to a ranging system controller 250 for further processing. For instance, the data can be encoded by one or more encoders of ranging system controller 250 and then sent as data packets to a user interface 215 and/or a vehicle control unit 217. Ranging system controller 250 can be implemented, e.g., using a programmable logic device such an FPGA, as an ASIC or as part of an ASIC, using a processor 258 with memory 254, or any combination of the above or other processing hardware. Ranging system controller 250 can control light sensing module 230 by sending (or relaying) commands that include start and stop light detection commands and commands to adjust photodetector parameters. Similarly, ranging system controller 250 can also control light transmission module 240 by sending (or relaying) commands that include start and stop light emission commands and commands to adjust light-emitter parameters (e.g., pulse codes, intensity, etc.). In some embodiments, ranging system controller 250 has one or more wired interfaces or connectors for exchanging data with light sensing module 230 and with the transmission module 240. In other embodiments, ranging system controller 250 communicates with light sensing module 230 and light transmission module 240 over a wireless connection such as an optical communication link.

Electric motor 260 can be provided when components of light ranging device 210, e.g., Tx module 240 and Rx module 230, are rotatable. System controller 250 can control electric motor 260 and can, for instance, start rotation, stop rotation and vary the rotation speed.

In some embodiments, lidar system 200 can interact with one or more instantiations of a user interface 215. Different instantiations of user interface 215 can vary and may include, e.g., a computer system with a monitor, keyboard, mouse, CPU and memory; a touch-screen in an automobile; a handheld device with a touch-screen; or any other appropriate user interface. User interface 215 may be local to the object upon which light ranging device 210 is mounted but can also be a remotely operated system. Communication between light ranging device 210 and user interface 215 can use wired or wireless connections. For example, commands and data to/from light ranging device 210 can be routed through a cellular network (LTE, etc.), a personal area network (Bluetooth, Zigbee, etc.), a local area network (Wi-Fi, IR, etc.), or a wide area network such as the Internet.

User interface 215 can include a combination of hardware and software components that can present lidar data (including, e.g., raw histogram data, filtered histogram data, and/or time-of-flight or ranging measurements) from light ranging device 210 to the user and can also allow a user to control lidar system 200 with one or more commands. Example commands can include commands that activate or deactivate the lidar system; specify photo-detector exposure level, bias, sampling duration and other operational parameters (e.g., emitted pulse patterns and signal processing); specify light emitters parameters such as brightness; and so on. In addition, commands can allow the user to select the method for displaying results. The user interface can display lidar system results which can include, e.g., a single frame snapshot image, a constantly updated video image, and/or a display of other light measurements for some or all pixels. In some embodiments, user interface 215 can track distances (proximity) of objects from light-ranging device 210 and potentially provide alerts to a user or provide such tracking information for other purposes. For example, in an automotive driver-assistance application, user interface 215 can provide proximity alerts to a driver, provide tracking information for analytics of driver performance, and so on.

In some embodiments, light ranging device 210 can communicate with a vehicle control unit 217 (or other equipment control unit) in addition to or instead of user interface 215, and vehicle control unit 217 can modify one or more parameters associated with control of a vehicle (or other equipment) based on the received lidar data. For example, in a fully autonomous vehicle, the lidar system can provide a real time 3D image of the environment surrounding the car to aid in navigation. In other cases, the lidar system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. It should be understood that light ranging device 210 is not limited to automotive applications and that ranging data generated by light ranging device 210 can be used in any application that uses ranging data for any purpose.

3. Example Coaxial Lidar Arrays

Figure 3:
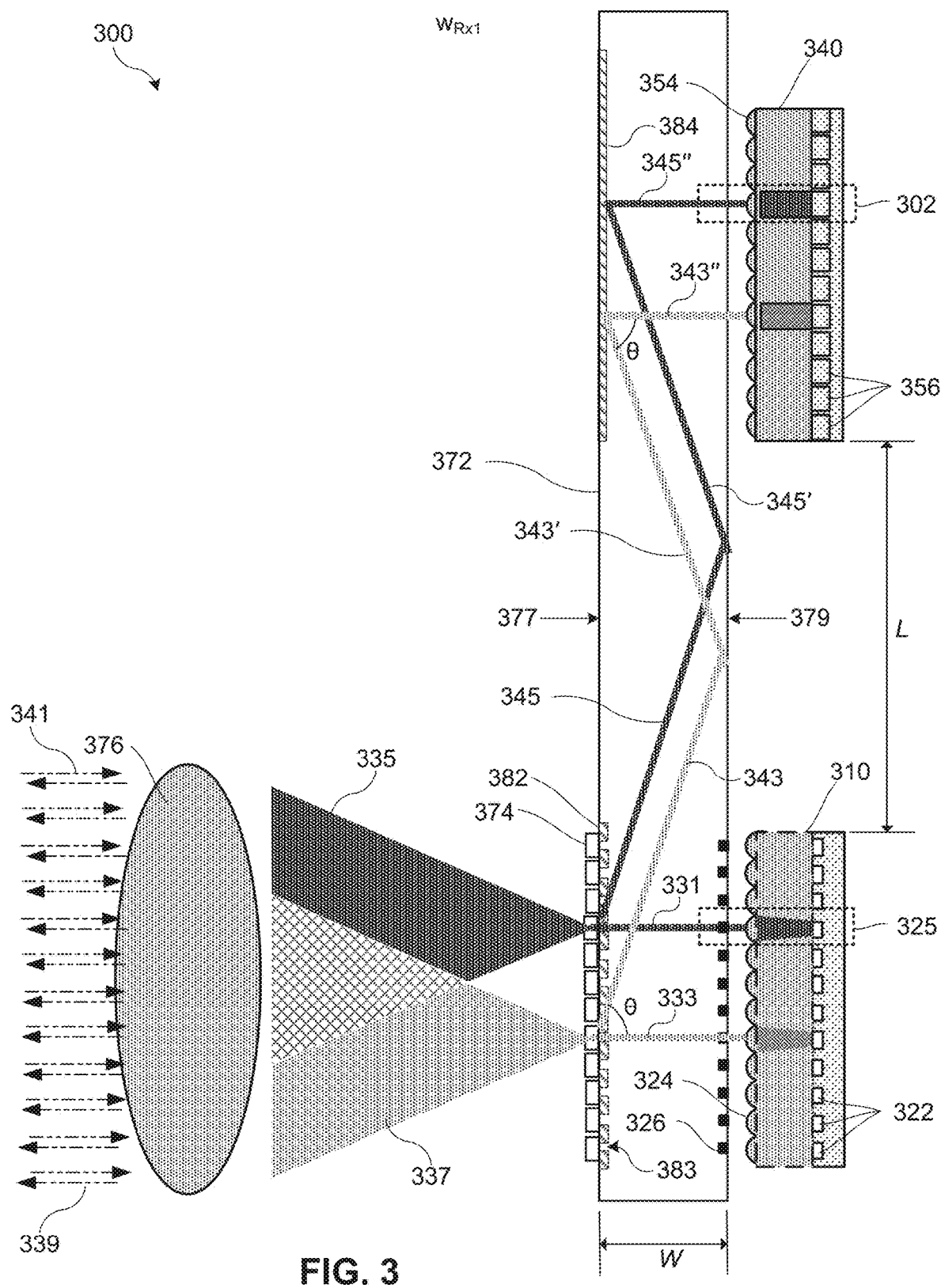
FIG. 3 shows a simplified side cross-section view of a coaxial lidar device that can be used in some embodiments.

In some embodiments, emitter array 242 and sensor array 236 can be implemented in a single ASIC or a pair of matched ASICs. FIG. 3 shows a simplified side cross-section view of a coaxial lidar device 300 that can be used in some embodiments. Coaxial lidar device 300 includes a light transmission (Tx) module 310 and a light sensing (Rx) module 340, which can correspond to light transmission module 240 and light sensing module 230 of FIG. 2. Additional examples of configurations for light transmission module 310 and light sensing module 340 are set forth in U.S. Pat. No. 10,222,475 (entitled "Optical Imaging Transmitter with Brightness Enhancement," issued Mar. 5, 2019), and U.S. Patent Application Pub. No. 2018/0329061 (entitled "Spinning lidar Unit with Micro-optics Aligned behind Stationary Window," published Nov. 15, 2018), the disclosures of each of which are incorporated herein by reference in their entirety.

As shown in FIG. 3, Tx module 310 includes an array of light emitters 322 and optionally includes a micro-optic lens layer 324 and an aperture layer 326. Emitters 322 can be arranged in a one-dimensional or two-dimensional array of transmitter channels, e.g., channel 325 shown in the boxed region. Each one of emitter channels 325 (also referred to as "transmitter" channels) has one or more light emitters 322, e.g., near-infrared (NIR) vertical cavity semiconductor lasers (VCSELs) or the like, capable of emitting narrowband light, and optionally, a micro-lens from lens layer 324 and an aperture from aperture layer 326. Emitters 322 can be, e.g., near-infrared (NIR) vertical cavity semiconductor lasers (VCSELs) or the like, capable of emitting narrowband light at a particular wavelength, referred to as the "operating" wavelength, which can be chosen as desired. The microlenses in lens layer 324 can be, e.g., collimating lenses that collimate light emitted by light emitters 322.

Rx module 340 includes an array of photosensors 356 and optionally includes an aperture array (not shown) and a micro-optic lens layer 354. Photosensors 356 can include electronic devices that detect photons incident on an active area and generate an electrical signal (e.g., a current) in response to incident photons. Photosensors 356 can include, e.g., one or more standard photodiodes, APDs, SPADs, resonant cavity photodiodes (RCPs), optical nanoantennas, microbolometers, or other suitable photodetectors. In some embodiments, a photosensor 356 may be composed of several photon detector areas (e.g., each a different SPAD) cooperating together to act as a single sensor, which can provide higher dynamic range, faster response time, or other beneficial properties as compared to a single large photon detection area.

Photosensors 356 can be arranged in a one-dimensional or two-dimensional array of sensor channels, e.g., channel 302 shown in the boxed region. Each sensor channel 302 can include one or more photosensors 356 and other components, such as a filter (e.g., a narrow-band filter matched to the emission wavelength of emitters 322 to filter out ambient light) and/or structural elements (e.g., diffusers, converging lenses, apertures, optically-non-transparent tube spacer structures, optically-non-transparent conical spacer structures, etc.) to improve detection efficiency and/or reduce cross talk with neighboring sensor channels. Each sensor channel 302 can also have a micro-lens from micro-optic lens layer 356 and an aperture. Sensor channels 302 of Rx-side micro-optics package 350 can be arranged to match Tx-side micro-optics package 320, with a sensor channel 302 corresponding to each transmitter channel 325. In some embodiments, the field of view of each individual sensor channel 302 matches the field of view of the corresponding transmitter channel 325.

Coaxial lidar device 300 can also include beam steering components implementing beam steering module 270 of FIG. 2. For instance, as shown in FIG. 3, coaxial lidar device 300 includes a diffractive waveguide 372, a secondary micro-optic layer 374, and a bulk optic module 376. Diffractive waveguide 372 can be made of a material that is optically transparent at the operating wavelength of lidar device 300 and can have a square or rectangular cross section with a planar front surface 377 and a planar rear surface 379 opposite front surface 377. A first diffraction grating 382 is formed on or adjacent to front surface 377 in the area through which light emitted from Tx module 310 passes. First diffraction grating 382 has openings 383 (which can be areas devoid of diffractive surface features) formed therein to permit light from Tx module 310 to pass through undiffracted. A second diffraction grating 384 is formed on or adjacent to front surface 377 in the area in front of Rx module 340. Diffraction gratings 382, 384 can be formed using a variety of techniques, including well-known techniques. For example, diffraction gratings 382, 384 can be formed as periodic structures such as surface relief features (e.g., grooves, rulings), slits, holographic patterns, or the like. Any type of diffraction grating can be used. For example, first diffraction grating 382 can be a transmissive (or refractive) grating with periodic structures shaped and sized such that light having the operating wavelength and incident normal to front surface 377 is diffracted along the length of diffractive waveguide 372 at a particular angle ($\theta$) that is greater than the critical angle for total internal reflection in diffractive waveguide 372. Second diffraction grating 384 can be a reflective grating with periodic structures shaped and sized such that light having the operating wavelength and incident at the angle $\theta$ is redirected along a path normal to front surface 377. Other configurations are also possible; examples are described below.

Secondary micro-optic layer 374 can include an array of micro-lenses aligned with the paths of the (collimated) light beams emitted from Tx module 310. Each micro-lens in array 324 can have a negative focal length such that collimated light beams entering from Tx module 310 diverge as they pass through. Bulk optic module 376 can include a single lens, multi-lens group, or mirrored optical design that forms a paraxial lens that collimates the diverging light beams such that each collimated beam propagates in a direction parallel to the optical axis of bulk optic module 376.

In operation, Tx module 310 can provide active illumination of objects in the area around the lidar system by transmitting pulses of narrow-band light, e.g., NIR light having a spectral width of, e.g., 10 nm, 2 nm, 1 nm, 0.5 nm, 0.25 nm or less, into one or more fields of view. Light emitted from each one of emitters 322 diverges as it approaches one of the micro-optics of micro-optic lens layer 324. A micro-lens in micro-optic lens layer 324 captures the diverging light and collimates it into a beam (e.g., beams 331, 333). The beam enters an aperture in aperture layer 326, which includes an array of apertures that correspond in position to the array of micro-optics 324 and the array of emitters 322. Aperture array 326 can reduce crosstalk in the system. After passing through apertures 326, the collimated beams 331, 333 propagate across the transparent body of diffractive waveguide 374 toward diffraction grating 382. Each collimated light beam passes through one of the openings 383 in diffraction grating 382 and enters the micro-lenses of secondary micro-optic layer 374. These micro-lenses cause the collimated light beams to diverge, as shown by light cones 335, 337. Bulk optic module 376 can act as a paraxial lens that collimates light cones 330, 332. Accordingly, transmitted light can exit bulk optic module 376 as a set of collimated and parallel light beams directed to different fields of view in front of the device, as indicated by rays 339. In some embodiments, bulk optic module 376 can be designed to capture substantially all light produced by the emitter array, even light that is emitted from the emitters on the outer edges of the array.

Some or all of the light exiting bulk optic module 376 can reflect off objects in the environment and back toward bulk optic module 376, as indicated by rays 341. In addition, ambient light can also enter bulk optic module 376. As used herein, "ambient" light refers to any light rays that may be propagating in the environment and that did not originate from Tx module 310. Ambient light can include direct light from any light source that happens to be present in the environment (e.g., the sun, an artificial luminaire, a traffic signal, etc.) as well as light that has been reflected or scattered by an object in the environment (e.g., light reflected off a road sign, a vehicle, a road surface, a tree, etc.). Ambient light can propagate in any direction, and ambient light that happens to be propagating in a similar direction to light rays 341 may enter and pass through bulk optic module 376.

Reflected light rays 341 enter bulk optic module 376 and are converged (e.g., as shown by cones 335, 337) back toward secondary micro-optic layer 374, which collimates the reflected light into beams. The reflected light beams are generally wider than the emitted light beams, and at least a portion of each reflected light beam encounters a diffractive area of first diffraction grating 382. As described above, diffraction grating 382 can be a refractive grating tuned to the operating wavelength of lidar system 300, such that the reflected light beams are deflected along the length of diffractive waveguide 372 at an angle $\theta$, as shown by beams 343, 345. Beams 343, 345 are incident on rear surface 379 of diffractive waveguide 379 at angle $\theta$. Provided that the angle $\theta$ is greater than the critical angle for total internal reflection, beams 343, 345 are reflected back toward front surface 377, as shown by beams 343', 345'. In some embodiments, the angle $\theta$, the lateral distance (L) between Tx module 310 and Rx module 340, and the width (W) of waveguide 372 can also be chosen such that the received light beams corresponding to all emitter channels are incident on rear surface 379 in an area between Tx module 310 and Rx module 340. The surface portion where beams 343, 345 are incident can be devoid of surface features. Reflected beams 343', 345' continue to propagate within diffractive waveguide 372 and are incident on second diffraction grating 384 at angle $\theta$. As described above, diffraction grating 384 can be a reflective grating tuned to the operating wavelength of lidar system 300 such that light beams 343', 345' are reflected onto a path normal to front surface 377. Reflected light beams 343", 345" pass transversely through diffractive waveguide 372 and into Rx module 340. For example, light beam 345" enters receiver channel 302.

Figure 4A:
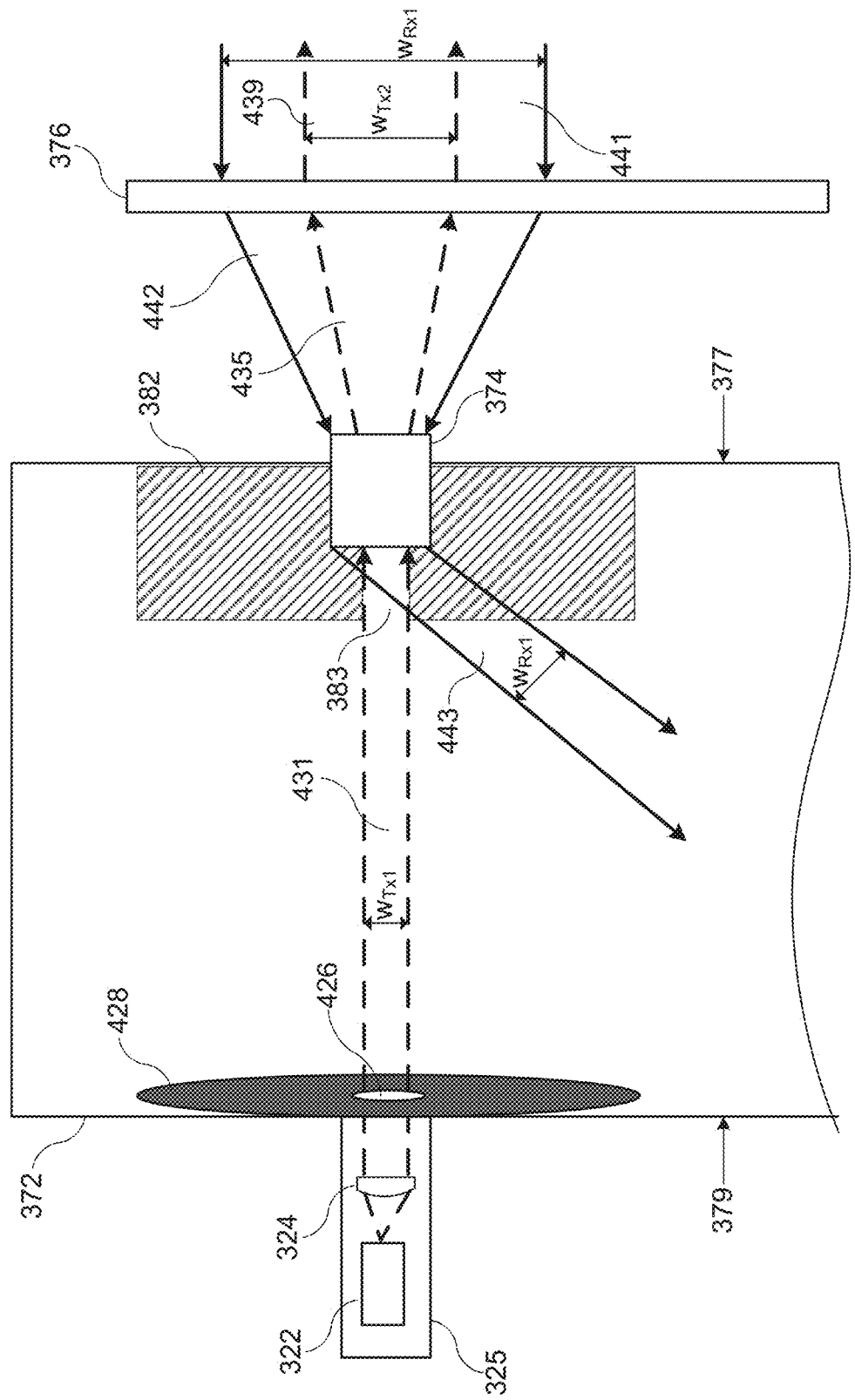
FIGS. 4A-4C are simplified optical diagrams showing additional details of optical paths for a coaxial lidar device according to some embodiments.
Figure 4B:
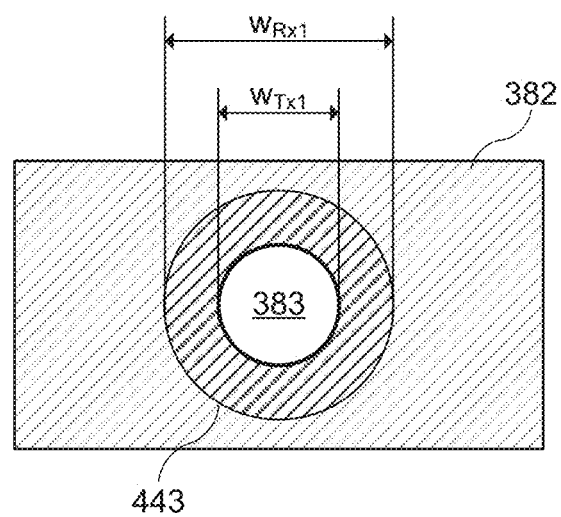
Figure 4C:
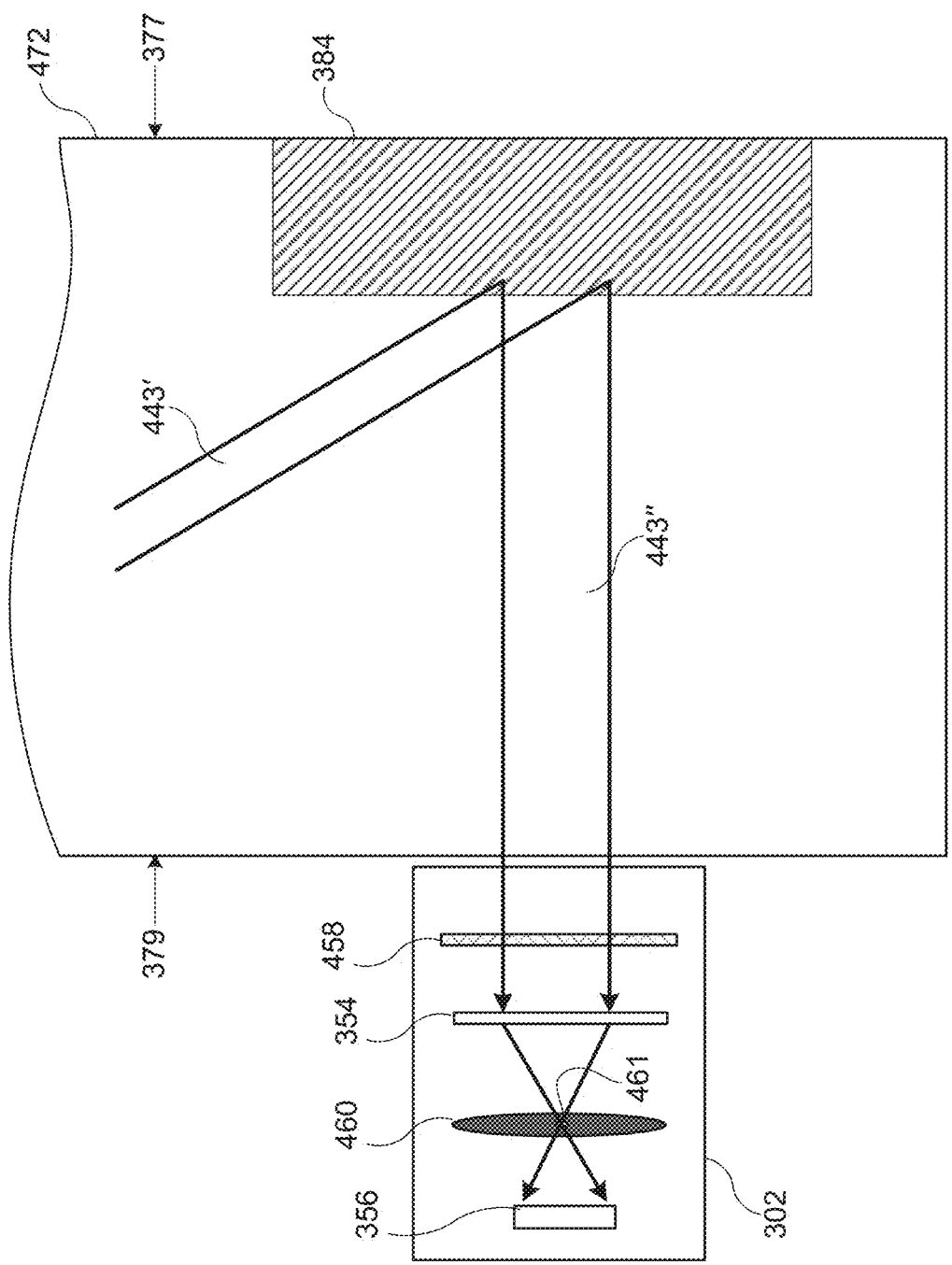

FIGS. 4A-4C are simplified optical diagrams showing additional details of optical paths for coaxial lidar device 300 according to some embodiments. FIG. 4A shows transmit channel 325. As described above, transmit channel 325 can include a light emitter 322, which can be, e.g., a VCSEL or other solid-state device capable of emitting narrowband light in the NIR wavelength range. A first micro-lens 324 can collimate the light emerging from light emitter 322, forming a transmit beam 431. An aperture layer 428 can include a sheet or coating of material (e.g., metal) that is opaque at the wavelength of transmit beam 431 and can be disposed, e.g., on the rear surface 379 of diffractive waveguide 372. An aperture 426 (e.g., a hole or gap in the opaque material) can be formed in aperture layer 428 to allow transmit beam 431 to pass through. Aperture 426 can constrain the width of transmit beam 431 to a width $w_{Tx1}$. In some embodiments, opaque aperture layer 428 can be omitted, and rear surface 379 of diffractive waveguide 472 can be a flat optical surface in the region where aperture layer 428 is shown. A first diffraction grating 382 can be disposed on or near the front surface of diffractive waveguide 472, and an opening 383 in diffraction grating 382 can allow transmit beam 431 to pass through without being diffracted. In some embodiments, opening 383 can have the same width $w_{Tx1}$ as aperture 426. Opening 383 can be a region (e.g., a circular region) that is free of diffractive features so that transmit beam 431 is not redirected and can continue into micro-lens 374, which emits transmit cone 435. Transmit cone 435 enters bulk optic module 376, which can be an optical collimating system incorporating one or more lenses and/or mirrors, and emerges into the environment as a collimated beam 439 having a width $w_{Tx2} > w_{Tx1}$.

A portion of collimated beam 439 can reflect off an object in the environment and back toward bulk optic module 376 as beam 441. Due to a variety of factors, such as beam 439 not being perfectly collimated and/or surfaces in the environment not being perfectly normal to beam 439, reflected beam 441 generally has a width $w_{Rx1}$ that is greater than width $w_{Tx2}$ of beam 439. Accordingly, received light cone 442 produced by bulk optic module 376 is wider than transmit light cone 435. Micro-optic 374 can be wide enough that all of received light cone 442 is condensed by micro-optic 374, and the received beam 443 produced when received light cone 442 passes through micro-optic 374 can have a width $w_{Rx2}$ that is greater than width $w_{Tx1}$ of transmit beam 431. Accordingly, a portion of the received light is incident on active areas of diffraction grating 382. FIG. 4B is a simplified rear view of diffraction grating 382 according to some embodiments, showing the shaping of received beam 443. As shown, diffraction grating 382 has a circular opening 383 therein. Opening 383 can be formed by omitting diffractive surface features in a circular region having diameter $w_{Tx1}$, thereby creating an area where transmit beam 431 can pass through diffraction grating 482 without being diffracted. Received beam 443 produced by micro-lens 374 has a diameter $w_{Rx2} > w_{Tx1}$. Portions of received beam 443 that are incident on opening 383 may continue straight on, unaffected by diffraction grating 383. An annular portion of received beam 443, however, is incident on the diffractive structures in diffraction grating 383 and is diffracted. Thus, beam 443 can be an annular beam with an inner diameter approximately equal to $w_{Tx1}$ and an outer diameter approximately equal to $w_{Rx2}$. Beam 443 is collimated, and the annular shape is generally preserved as beam 443 propagates in diffractive waveguide 372.

FIG. 4C shows a receiver channel 302, which can include a photosensor 356, as described above. Receiver channel 302 can also include a focusing micro-lens 354, a bandpass filter 458 that selectively passes light having the transmit wavelength and blocks light of other wavelengths, and a pinhole aperture plate 460 having a central opening 461 that allows light to pass through. Pinhole aperture plate 460 can be positioned at the focal point of micro-lens 354. In some embodiments, aperture plate 460 can help to block off-axis light that is likely due to noise. Beam 443' (shown in FIG. 4A) can propagate along the length of diffractive waveguide 372 via total internal reflection (e.g., as shown in FIG. 3) until it reaches second diffraction grating 384 and is diffracted into a path normal to front surface 377 and rear surface 379. At that point, beam 443" can exit diffractive waveguide 372 and enter receiver channel 302.

As shown in FIGS. 4B, the received light beam 443 can lose some intensity due to the opening 383 in first diffraction grating 382. For instance, in some embodiments around 35% of incident light may be lost. In some embodiments, the coaxial configuration of the bulk optics can provide increased efficiency that at least partially offsets this loss, and overall system performance may be similar. In addition, a coaxial optical configuration such as that shown in FIGS. 3 and 4A-4C can eliminate parallax between the emitted and received light paths, which may reduce the shortest distance that can be detected. Further, by eliminating the need for separate bulk optics for the transmit and receive paths, a coaxial configuration with a diffractive waveguide can allow for reductions in overall size and weight of a lidar system.

It will be appreciated that coaxial lidar system 300 is illustrative and that variations and modifications are possible. A lidar system can include any number of emitter channels and receiver channels, including the simplest case of just one emitter channel and one receiver channel. Where multiple channels are present, the channels can be arranged in an array. Lidar channel arrays can be one-dimensional or two dimensional. For example, FIG. 3 shows one-dimensional arrays of transmitter and receiver channels. In some embodiments, two-dimensional arrays can be used. Per-channel micro-optics, filters, and/or other optical components can be included in the emitter and/or receiver channels as desired, and such components can be selected according to the characteristics of a particular emitter and/or photodetector. In some embodiments, portions of adjacent emitter channels (and portions of adjacent receiver channels) can be separated by opaque structures (e.g., sidewalls) to reduce crosstalk.

Figure 5:
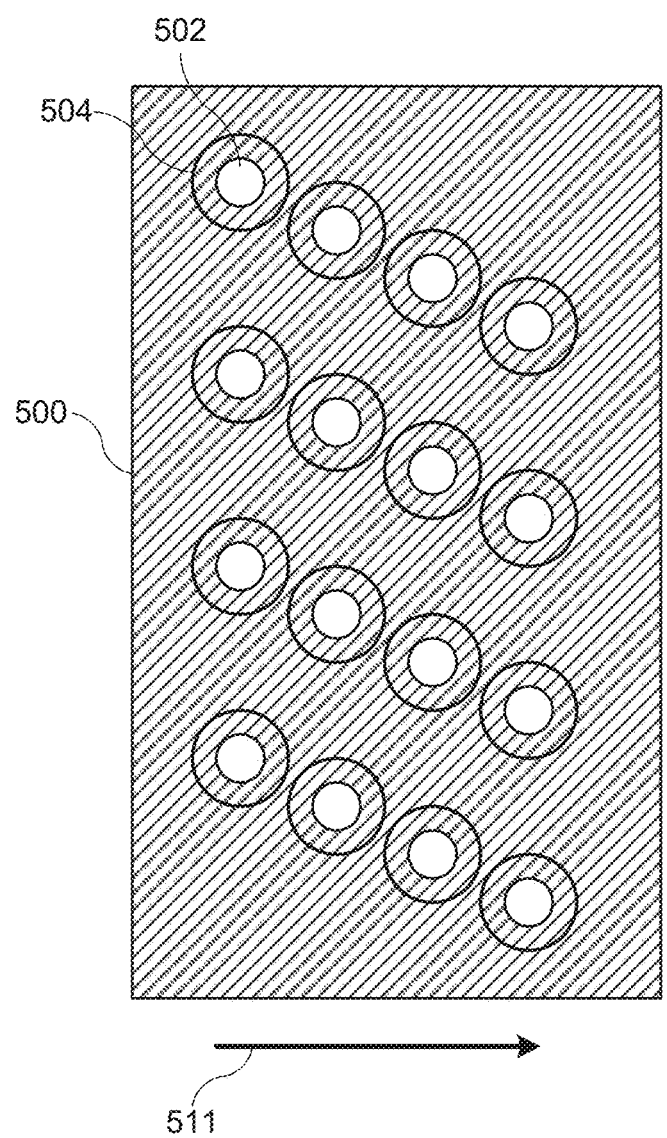
FIG. 5 shows a diffraction grating according to some embodiments.

The arrangement and spacing of emitter and receiver channels in an array can also be varied. By way of example, FIG. 5 shows a diffraction grating 500 according to some embodiments. Diffraction grating 500 can be used to implement first diffraction grating 374 of FIG. 3. Diffraction grating 500 includes openings 502 arranged in a pattern that corresponds to the spatial arrangement of the emitter channels; it should be understood that the receiver channels can be arranged to match the emitter channels. As noted above, openings 502 can be formed by omitting diffractive surface features from the relevant areas of diffraction grating 500. Alternatively, diffraction grating 500 can be formed as a plate, and openings 502 can be formed as holes through the plate.

In this example, the emitter channels (and openings 502) are arranged to form a staggered column. If the lidar system is operated in a scanning mode in the direction shown by arrow 511, an arrangement of emitter and receiver channels that corresponds to openings 502 can be used to obtain 16 lines of pixels. Staggering of the channels in this manner can provide a desired scanning resolution with a larger spacing between channels, which can reduce crosstalk. For instance, as shown by rings 504, the received beams, which are wider than openings 502, do not overlap with each other, which can help to avoid crosstalk between receiver channels.

A diffractive waveguide can have an elongate body made of an optically transparent material (e.g., glass, acrylic, various plastics) that has a refractive index higher than that of the surrounding medium (e.g., air), such that total internal reflection can occur at surfaces of the waveguide body as a beam of light propagates along the length of the waveguide. The body can have a square or rectangular cross section and can be straight along its length. In some embodiments, portions of surfaces where internal reflection is desired can be coated with reflective material, which may further reduce light loss. Diffraction gratings can be positioned at selected locations along the diffractive waveguide where steering of a beam is desired. Each diffraction grating can be of a reflective type (where light of the operating wavelength exits on the same side as it enters) or transmissive (also called "refractive") type (where light of the operating wavelength exits on the opposite side from where it enters), and different diffraction gratings can be on the same surface or opposing surfaces. Various combinations are possible. Examples will now be described.

Figure 6:
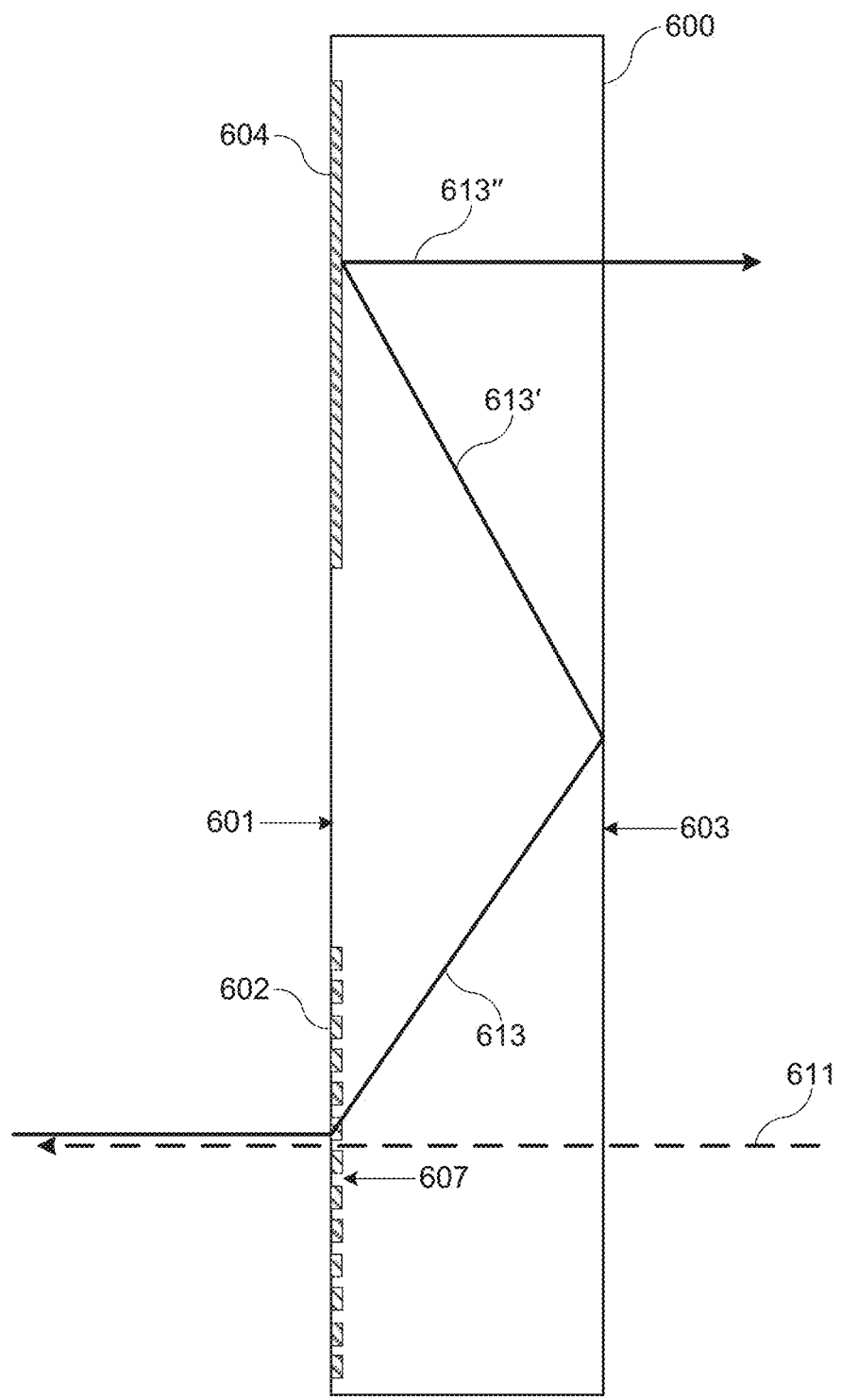
FIG. 6 shows a diffractive waveguide that can be used according to some embodiments.

FIG. 6 shows a diffractive waveguide 600 that can be used in a lidar system according to some embodiments. Diffractive waveguide 600 includes a first diffraction grating 602 and a second diffraction grating 604, both disposed on front surface 601. Similarly to the example shown in FIG. 3, diffraction grating 602 has openings 607 for transmit beams (dashed arrow 611) to pass through without being diffracted. Received beam 613 is refracted by diffraction grating 602 and propagates along diffractive waveguide 600. In this example, a total internal reflection occurs at rear surface 603, and reflected beam 613' is incident on second diffraction grating 604. Second diffraction grating 604 can be reflective, such that beam 613" is routed out of waveguide 600 through rear surface 603. In some embodiments, second diffraction grating 604 can be replaced by a different component that is also capable of redirecting light, such as a mirror (or array of mirrors) placed at an appropriate angle to the incident beam.

Figure 7:
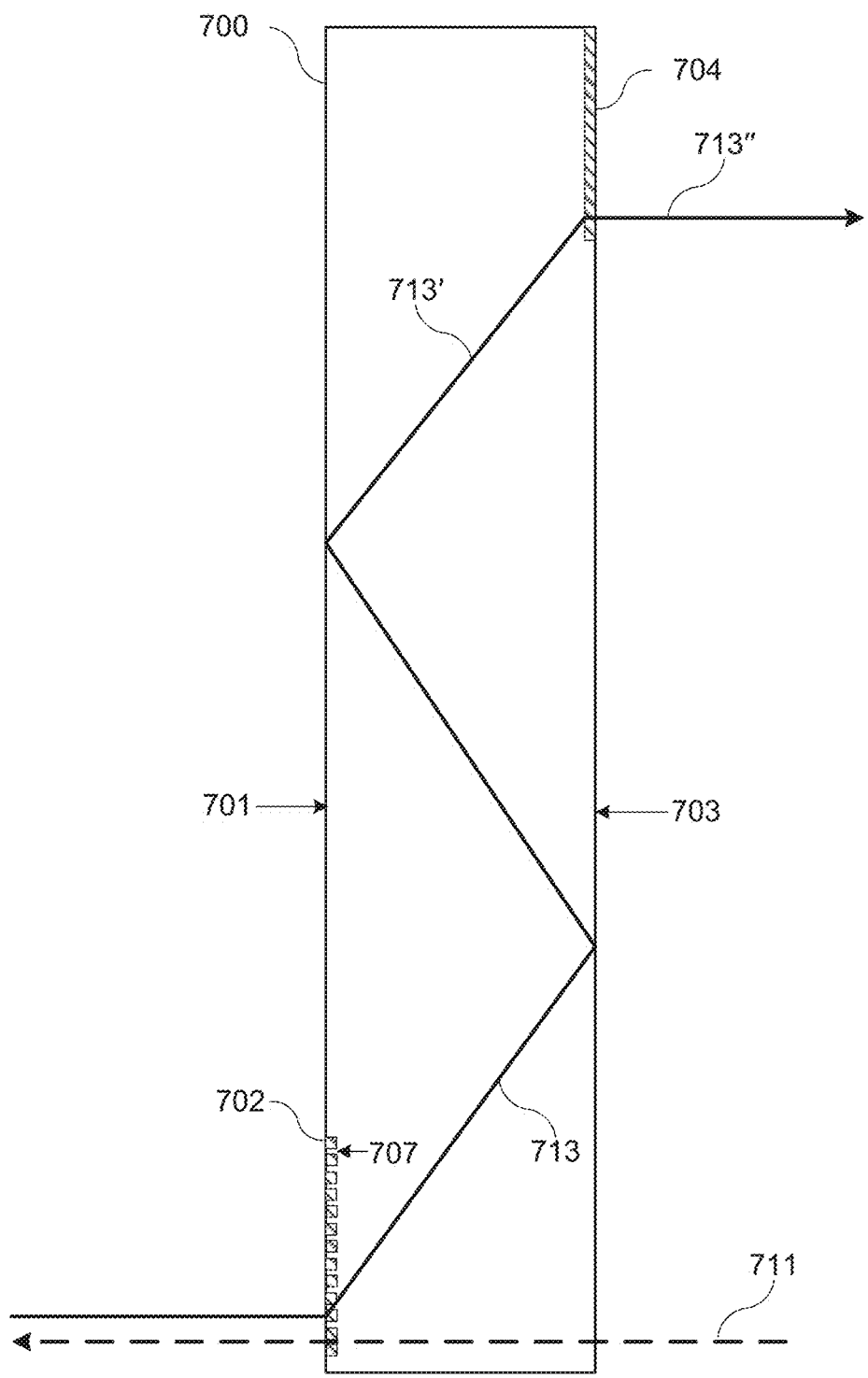
FIG. 7 shows another diffractive waveguide that can be used according to some embodiments.

FIG. 7 shows another diffractive waveguide 700 that can be used in a lidar system according to some embodiments. Diffractive waveguide 700 includes a first diffraction grating 702 disposed on front surface 701 and a second diffraction grating 704 disposed on rear surface 703. Similarly to examples described above, diffraction grating 702 has openings 707 for transmit beams (dashed arrow 711) to pass through without being diffracted. Received beam 713 is refracted by diffraction grating 702 and propagates along diffractive waveguide 700. In this example, a first total internal reflection occurs at rear surface 703, and a second total internal reflection occurs at front surface 701 to direct beam 713' onto second diffraction grating 704. Second diffraction grating 704 can be a refractive grating that deflects beam 713" so that it exits waveguide 700 through rear surface 703.

Figure 8:
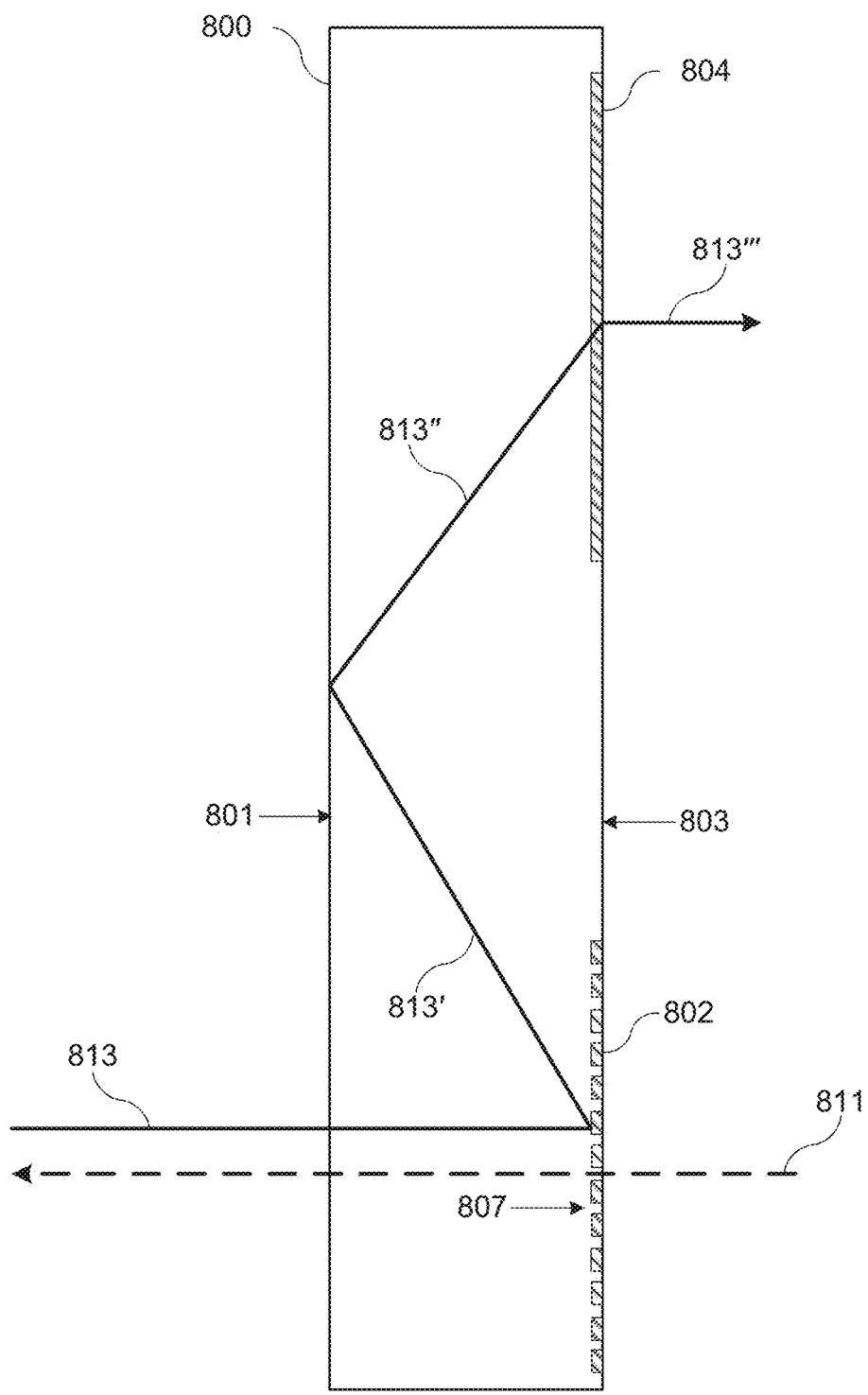
FIG. 8 shows a third diffractive waveguide that can be used according to some embodiments.

FIG. 8 shows a third diffractive waveguide 800 that can be used in a lidar system according to some embodiments. Diffractive waveguide 800 includes a first diffraction grating 802 and a second diffraction grating 804, both disposed on rear surface 803. Similarly to examples described above, diffraction grating 802 has openings 807 for transmit beams (dashed arrow 811) to pass through without being diffracted. Received beam 813 is reflected by diffraction grating 802 and propagates (beam 813') along diffractive waveguide 800. In this example, a total internal reflection occurs at front surface 801 to direct beam 813" onto second diffraction grating 804. Second diffraction grating 804 can be a refractive grating that deflects beam 813" so that it exits (beam 813''') waveguide 800 through rear surface 803.

The diffractive waveguides shown in FIGS. 6-8 and associated beam paths are illustrative and not limiting. Diffraction gratings can be constructed according to any technique that imparts surface features with a spacing that redirects light at the operating wavelength through a desired angle. For example, diffraction gratings can be formed using grooves or holographic techniques known in the art. Any combination of diffraction gratings can be used, including any combination of reflective and transmissive diffraction gratings, with any number of total internal reflections along the beam path between the gratings. Diffraction gratings can be provided at selected portions of the surface(s) of the diffractive waveguide to effect beam steering, and that the remainder of the surface can be smooth (non-diffractive). The size of the emitter and sensor arrays and the deflection angles of the diffraction gratings can be chosen such that the total internal reflections for the beams directed to all sensor channels occur in areas where diffraction gratings, as well as the emitter and sensor arrays, are absent. If desired, reflective material can be applied along sections of the waveguide where total internal reflection is desired. Different combinations of diffraction gratings and surface reflection can be used to guide reflected light beams toward a sensor array, and the relative placement of emitter and sensor arrays can be selected such that light from a particular emitter channel that reflects in the environment arrives at the corresponding receiver channel.

FIGS. 6-8 show examples of "same-side" waveguide configurations, in which the emitted beam enters through the rear surface of the waveguide, and the received beam exits through the rear (same) surface. A same-side waveguide configuration allows the emitter and sensor arrays to be placed on the same side of the waveguide, which can facilitate alignment. For example, the emitter and sensor arrays can be fabricated on the same semiconductor substrate, with an appropriate spacing (e.g., distance L in FIG. 3) between the arrays. However, other embodiments may have the diffraction gratings arranged such that the transmit beam enters through one surface while the received beam exits through a different surface. For instance, the transmit beam can enter through the rear surface while the received beam exits through the front surface, or the received beam can propagate out an end surface of the waveguide to receiver channels positioned at a right angle (or an oblique angle) to the transmitter channels.

4. Additional Embodiments

While the invention has been described with reference to specific embodiments, those skilled in the art with access to the present disclosure will appreciate that numerous variations and modifications are possible. For example, in embodiments described above, a coaxial lidar system uses the same bulk optic module for both the emitted and received light paths, and a diffractive waveguide redirects received light toward the sensors while allowing emitter light to pass through in a straight line. In some embodiments, the emitted light beam passes through openings in the diffractive waveguide, e.g., as described above with reference to FIG. 4B. This configuration can help to keep the emitted beam size small (and intensity high), while allowing for sufficient reflected light to be collected. However, other coaxial lidar configurations are not precluded. For example, emitter light can be steered by a diffractive waveguide toward the shared optics while received light passes straight through without diffraction. As another example, diffractive waveguides can be used to steer emitted light toward the shared optics and to steer reflected light toward the receiver array. Further, while diffractive waveguides described above have the shape of elongated cuboids, which are simple to construct, other shapes can also be substituted, including shapes with non-orthogonal faces and/or nonplanar surfaces and waveguides that provide curved or bent light paths.

lidar arrays of the kind described herein can be fabricated to include any number of emitter and sensor channels. In some embodiments, the channels can be arranged in one or more columns that may scan a field of view in a row-wise direction transverse to the column direction. (The terms "row" and "column" are used to distinguish two dimensions of a sensor array, particularly in the context of arrays used in scanning mode, and are not intended to imply any particular spatial orientation of the array.) In some embodiments, a column of channels can be staggered (e.g., as described above with reference to FIG. 5), such that different channels associated with the same column are offset from each other in the row-wise direction.

lidar emitters and sensor channels can operate at various wavelengths, including near infrared, shortwave infrared (e.g., 1600 nm), midwave infrared, and/or longwave infrared (e.g., up to 15 µm). In embodiments described above, it is assumed that the lidar system has a single operating wavelength for all channels. In some alternative embodiments, a lidar system may have multiple operating wavelengths. Where this is the case, diffractive waveguides can be stacked, with different waveguides steering beams of different wavelengths toward the appropriate receiver channels. Each diffractive waveguide can be constructed in the manner described above.

In some embodiments, a sensor array may also incorporate one or more ambient-light sensor channels (i.e., sensor channels that measure light intensity, as opposed to time-of-flight or other ranging data) in addition to the lidar sensor channels, and one or more ambient-light sensor channels can be arranged in a row with one or more lidar sensor channels, between lidar sensor channels, or elsewhere as desired. Lidar systems can be implemented using rotating and/or static platforms as described above and can be used in any application where it is desirable to collect ranging data.

Systems described herein can produce depth (or ranging) information across a field of view (which can be as wide as desired, up to 360 degrees in some embodiments). In some embodiments, the depth information can be used to generate images for display to a user, which can include directly rendering the image data and/or rendering an image of a scene (or portions thereof) based on algorithmic inferences from the data. Depth information can be used in various applications, such as proximity monitoring and alerting, 3D mapping (e.g., terrain mapping), and so on. While some examples described above relate to vehicle navigation and/or driver assistance, the invention is not limited to any particular data analysis or to any particular application of ranging data.

In some embodiments, a lidar system can include multiple emitter arrays and/or multiple sensor arrays. Multiple arrays can be arranged to use the same diffractive waveguide or different diffractive waveguides as desired.

All numerical values and ranges provided herein are illustrative and may be modified. Unless otherwise indicated, drawings should be understood as schematic and not to scale.

A recitation of "a", "an" or "the" is intended to mean "one or more" unless specifically indicated to the contrary. Reference to "one" of a particular component, feature, or other element is not intended to preclude additional co-existing instances of that component, feature, or other element, unless specifically indicated to the contrary. The use of "or" is intended to mean an "inclusive or," and not an "exclusive or" unless specifically indicated to the contrary.

The above description is illustrative and is not restrictive. The described embodiments were chosen in order to illustrate various principles of the invention and its practical applications, and many variations and modifications of the invention will become apparent to those skilled in the art upon review of the disclosure. Accordingly, although the invention has been described with respect to specific embodiments, it will be appreciated that the invention is intended to cover all modifications and equivalents within the scope of the following claims.

What is claimed is:

1. A lidar system comprising:
an emitter channel including a light source configured to produce light at an operating wavelength and a first micro-optic element configured to collimate the light produced by the light source;
a sensor channel including a photosensor, the sensor channel disposed at a lateral distance from the emitter channel;
a second micro-optic element configured to diverge the collimated light from the first micro-optic element and configured to collimate light received from an environment; and
a diffractive waveguide disposed between the first micro-optic element and the second micro-optic element, the diffraction waveguide including a diffraction grating that redirects received light having the operating wavelength from the second micro-optic element toward the sensor channel.

2. The lidar system of claim 1 wherein the diffractive waveguide has a first surface and a second surface opposite the first surface and wherein the diffractive waveguide includes:
a first diffraction grating disposed at the first surface and configured to redirect received light having the operating wavelength from the second micro-optic element into the diffractive waveguide at an angle that produces total internal reflection at the second surface; and
a second redirection component positioned to redirect received light that has reflected off the second surface in a direction out of the diffractive waveguide and into the sensor channel.

3. The lidar system of claim 2 wherein the first diffraction grating includes a non-diffractive opening sized and positioned such that the collimated light from the emitter channel passes through the non-diffractive opening.

4. The lidar system of claim 2 wherein the first surface is oriented toward the second micro-optic element and the first diffraction grating is a transmissive grating.

5. The lidar system of claim 2 wherein the first surface is oriented toward the first micro-optic element and the first diffraction grating is a reflective grating.

6. The lidar system of claim 2 wherein the second redirection component includes a second diffraction grating.

7. The lidar system of claim 2 wherein the second redirection component includes a mirror positioned at an angle to the first surface.

8. The lidar system of claim 1 further comprising an aperture layer disposed between the first micro-optic element and the diffractive waveguide, the aperture layer having an opening to admit light output by the first micro-optic element into the diffractive waveguide.

9. The lidar system of claim 1 further comprising:
a bulk optic module disposed between the second micro-optic element and the environment such that the emitter channel and the sensor channel have a common optical axis in the bulk optic module.

10. A lidar system comprising:
an array of emitter channels, each emitter channel including a light source configured to produce light at an operating wavelength and a first micro-optic element configured to collimate the light produced by the light source;
an array of sensor channels arranged such that each sensor channel corresponds to a different one of the emitter channels, each sensor channel including a light detector;
an array of second micro-optic elements, each second micro-optic element configured to diverge the collimated light from a corresponding one of the emitter channels and to collimate light received from an environment; and
a diffractive waveguide disposed between the first micro-optic elements and the array of second micro-optic elements, the diffraction waveguide including a diffraction grating that redirects received light having the operating wavelength from the array of second micro-optic elements toward the array of sensor channels.

11. The lidar system of claim 10 further comprising:
a bulk optic module disposed between the array of second micro-optic elements and the environment such that the emitter channels and the sensor channels have a common optical axis in the bulk optic module.

12. The lidar system of claim 10 wherein the diffractive waveguide has a first surface and a second surface opposite the first surface and wherein the diffractive waveguide includes:
a first diffraction grating disposed at the first surface and configured to redirect received light having the operating wavelength from the array of second micro-optic elements into the diffractive waveguide at an angle that produces total internal reflection at the second surface; and
a second redirection component positioned to redirect received light that has reflected off the second surface in a direction out of the diffractive waveguide and into the sensor channels.

13. The lidar system of claim 12 wherein the first diffraction grating includes an array of non-diffractive openings sized and positioned such that the collimated light from each of the emitter channels passes through one of the non-diffractive openings.

14. The lidar system of claim 12 wherein the first surface is oriented toward the second micro-optic element and the first diffraction grating is a transmissive grating.

15. The lidar system of claim 12 wherein the first surface is oriented toward the first micro-optic element and the first diffraction grating is a reflective grating.

16. The lidar system of claim 12 wherein the second redirection component includes a second diffraction grating.

17. The lidar system of claim 12 wherein the second redirection component includes a mirror positioned at an angle to the first surface.

18. The lidar system of claim 10 wherein the array of emitter channels and the array of sensor channels are formed on the same substrate.

19. The lidar system of claim 10 wherein the array of emitter channels and the array of sensor channels are one-dimensional arrays.

20. The lidar system of claim 10 wherein the array of emitter channels and the array of sensor channels are two-dimensional arrays.

* * * * *